Patented July 16, 1946

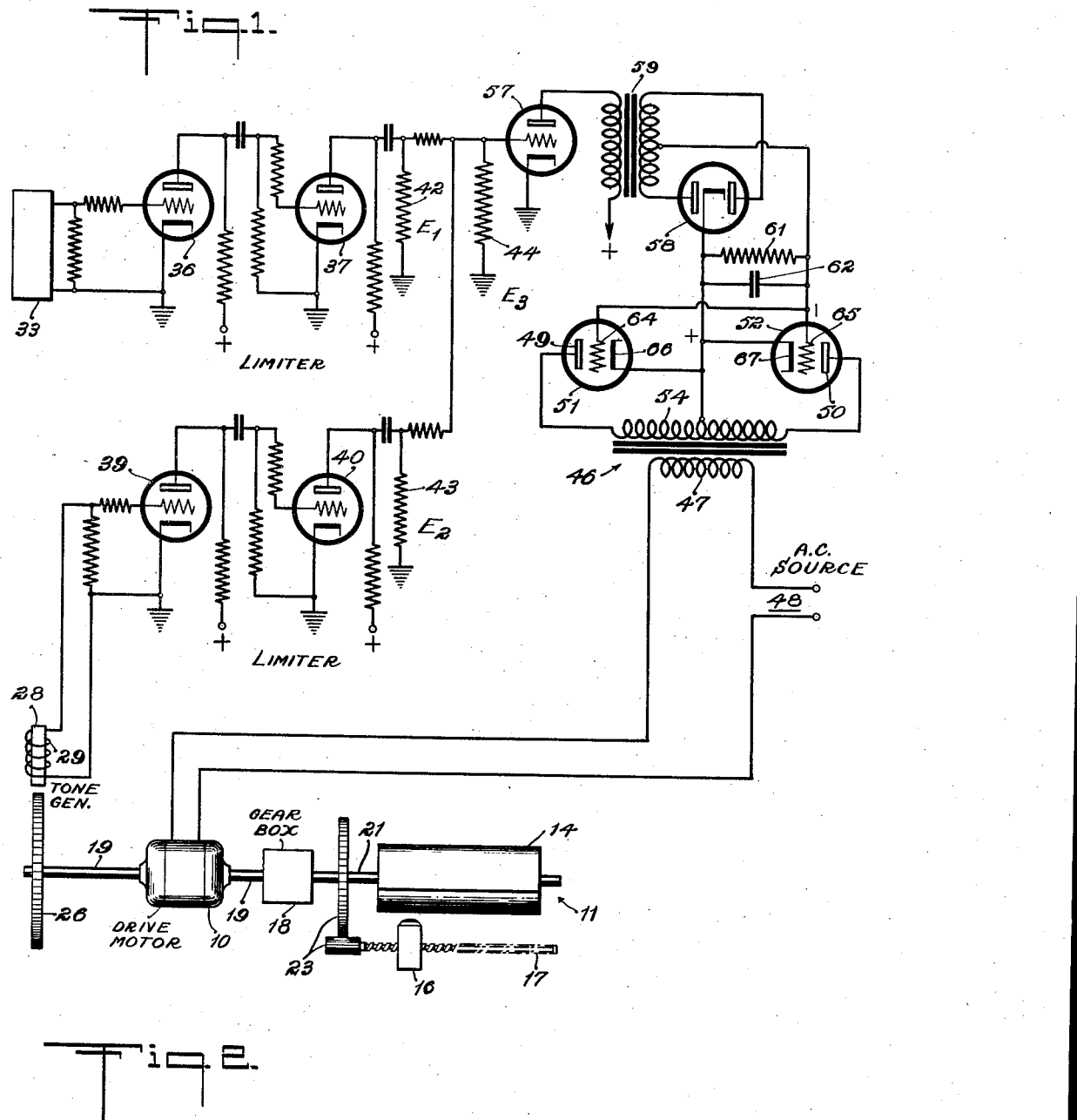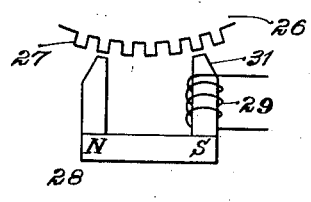

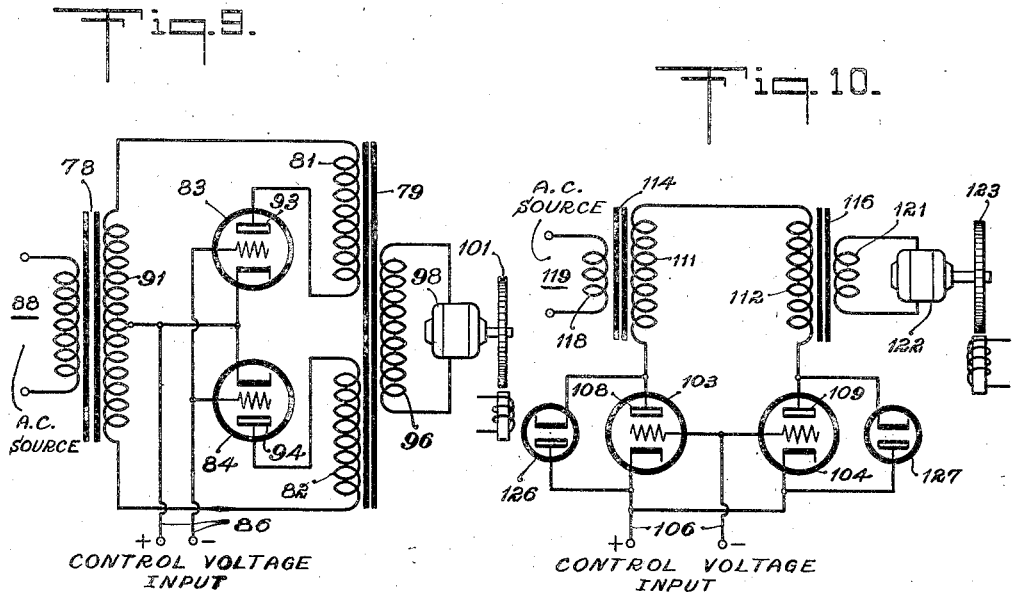
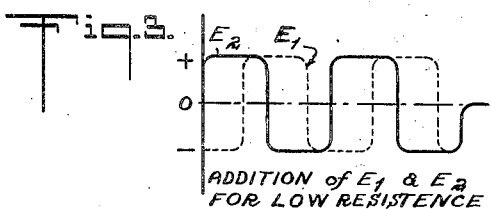
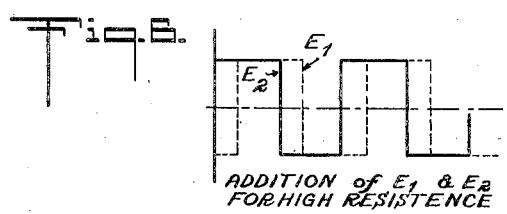
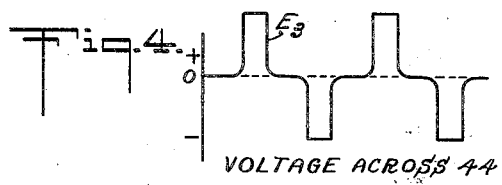
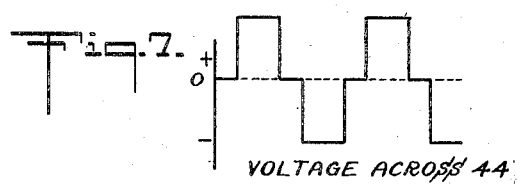
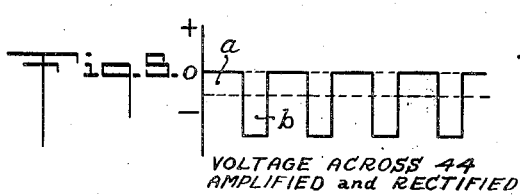
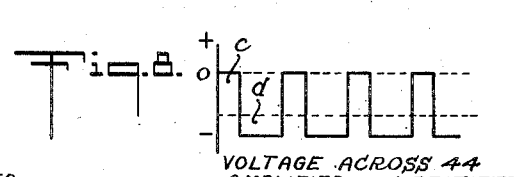

2,403,921

UNITED STATES PATENT OFFICE 2,403,921

SYNCHRONIZING DEVICE

Henry E. Hallborg, Upper Montclair, N. J., and Charles N. Gillespie, Brooklyn, and Gilbert R. Clark, Staten Island, N. Y., assignors to Radio Corporation of America, a corporation of Delaware Application June 19, 1943, Serial No. 491,538

8 Claims. (Cl. 172—293)

The present invention relates in general to systems for synchronizing the operation of two devices, and more particularly to synchronizing systems for facsimile transmitting and recording apparatus.

In the transmission and reception of facsimile signals, synchronism of a high degree of accuracy must be maintained between the scanning apparatus at the transmitting station and the recording apparatus at a receiving station or stations which are in communication with the transmission station. The present invention provides a novel arrangement by which a motor of inherently variable speed characteristics may be used for driving the scanning apparatus of a transmitter or recorder. Accordingly, one of the objects of the present invention is to provide a novel arrangement for operating a variable speed motor at a predetermined speed with a high degree of precision.

The last named object of the present invention is accomplished by comparing a reference frequency with a frequency produced concurrently with operation of a motor and comparing these frequencies and making adjustments in motor speed in a novel manner. The comparison of these two frequencies gives rise to a voltage proportional in magnitude to the instantaneous error in motor speed which voltage is employed in a novel manner to produce a resistance effect in the motor circuit.

From this will be seen that still another object of the present invention is to provide a novel arrangement for obtaining a control voltage which is proportional to the instantaneous error in the speed of the motor and employing this voltage to produce a change in resistance in the motor circuit.

The present invention, in general, comprises facsimile transmitting or recording apparatus, driven by an induction motor, to which is mechanically coupled means for developing electrical waves in accordance with the speed of the rotor of the motor. The phase of the signals developed in this manner is compared with the phase of a standard frequency tone or a received tone, and the resultant comparison wave is utilized to produce a control voltage. This control voltage is employed to vary the effective resistance in the power supply circuit of the induction motor.

The invention will be understood by a reference to the accompanying drawings, in which:

Fig. 1 is a diagrammatic showing of a facsimile station embodying the present invention in one form.

Fig. 2 is a fragmentary view to an enlarged scale of a detail of the apparatus shown in Fig. 1.

Figs. 3 to 8 inclusive are explanatory diagrammatic curves.

Fig. 9 is a fragmentary diagrammatic showing of a modification of the apparatus of Fig. 1, and Fig. 10 is a fragmentary diagrammatic showing of a further modification of the apparatus of Fig. 1.

Referring to Fig. 1 of the drawings, an induction motor 10 is shown as driving a facsimile scanner or the like indicated generally by reference character 11. This scanner may be of any desired type and may be used at a transmitting or receiving station. It is shown for purposes of illustration as being employed at a receiving station. The scanner 11 comprises a copy holding drum 14 and a scanning head 16 propelled axially along the drum by a lead screw 17. A suitable change speed device such as a gear box 18 may, if desired, be used to connect the drive shaft 19 of the motor with the drive shaft 21 of the scanner. A gear and pinion combination 23 drives the lead screw 17 at the proper relative speed so that closely spaced helical scanning lines are obtained as the scanning head 16 moves axially of the drum 14. Connected to the shaft 19 of the induction motor, is a tone wheel 26 which is provided with teeth 27 (Fig. 2) so that as the tone wheel revolves, the teeth 27 pass through the magnetic field of a yoke structure 28, thereby producing an alternating voltage in a coil 29 surrounding a portion of the magnetic circuit, for example, the pole piece 31, as shown. It will be understood that the tone wheel 26 may be geared to the motor shaft or mechanically connected in any suitable manner to a moving part of the scanner 11.

A standard frequency source 33 which may be of the type shown in Patent No. 2,113,365, granted to M. Artzt, produces a predetermined frequency which is maintained constant. The degree of accuracy with which this frequency is maintained constant is preferably 1 part in 100,000. The voltage output of the standard frequency source 33, which is approximately sinusoidal, is passed through a pair of tubes 36 and 37 which constitute a limiter-amplifier for changing the sine wave of voltage from the frequency standard 33 into a series of square waves. The voltage output of the coil 29, which is also substantially sinusoidal and equal in nominal frequency to the frequency of the source 33, is applied to a pair of tubes 39 and 40 which also constitute a limiter-amplifier, the output of which is a series of square wave impulses. The square wave output from the frequency standard 33 appears across a resistor 42, while the square wave output which is derived from the generator coil 29 appears across the resistor 43. In normal operation, the frequency of these waves is equal, but the phase relationship between them may vary momentarily. In Figs. 3 to 8 inclusive of the drawings, these square wave impulses are designated $E_1$ and $E_2$ respectively on Fig. 1. The resulting voltage which is proportional to the instantaneous speed of the motor 10 appears across a resistor 44 and is designated $E_3$ (see particularly Fig. 4).

The output voltage $E_3$ is applied in the following manner to affect changes in the effective or virtual ohmic resistance of the power supply circuit for the motor 10. Reference character 46 represents a transformer, the primary 47 of which is in series with the windings of the motor 10 and a power supply source, such as the A. C. mains, connected at 48. The transformer 46 may be an ordinary standard power transformer and the source 48 may be an alternating-current commercial service connection of suitable voltage and frequency. The anodes 49 and 50 of tubes 51 and 52 respectively are connected to the secondary 54 of the transformer 46. The connections to the remaining electrodes of these tubes will be described presently.

The voltage $E_3$, which appears across the resistor 44, is amplified, if desirable or necessary, in an amplifier tube 57 of any suitable type, the output of which is impressed on a full wave rectifier 58 by way of a transformer 59. The output of the rectifier 58 has a time constant circuit or filter comprising a resistance 61 and a condenser 62. A uni-directional voltage is provided in the output circuit of the rectifier 58, across the condenser 62, the average value of which varies in amplitude with the phase relationship between the two voltages $E_1$ and $E_2$. The electrically joined grids 64 and 65 of the previously mentioned tubes 51 and 52 respectively are connected to the negative side of the rectifier 58. The electrically joined cathodes 66 and 67 of these tubes are connected to the positive side of the rectifier 58. The unidirectional voltage which appears across the condenser 62 is thus impressed between the grid and cathode of each tube 51 and 52.

Referring to Figs. 3 and 4 of the drawings, a momentary condition is illustrated where the rotor of the motor 10 assumes a retarded angular position thereby requiring a relatively lower resistance to be reflected into the motor supply circuit. The phase relationship of the voltages $E_1$ and $E_2$ when added or beat together produces the curve $E_3$ of Fig. 4. After amplification and rectification, this output curve appears as shown in Fig. 5 of the drawings. The voltage which appears across the condenser 62 is shown by the dotted line of Fig. 5 of the drawings, which represents the average value. Under the conditions shown, the area $a$ is approximately equal to the area $b$. The curves of Figs. 3 to 8 are illustrative only and are not intended to represent accurate values to scale or actual wave forms.

Figs. 6 to 8 indicate the operation of the device when the rotor of the motor 10 assumes an advanced angular position and, therefore, a higher resistance is to be reflected into the power in the circuit of the motor. The dotted line of Fig. 8 of the drawings indicates that the average value of the control voltage is higher in this instance. Under the conditions shown, the area $c$ is approximately equal to the area $d$. Fig. 5 indicates less bias on tubes 51 and 52 than Fig. 8, therefore, their resistance will be lower and the motor will tend to speed up with conditions as shown for Fig. 5.

The tubes 51 and 52 are operated at substantially one-half of the voltage appearing across the secondary 54 of the transformer 46. Resistance is reflected from the secondary winding 54 into the primary winding 47 in proportion to the square of the turns ratio. Consequently, it is desirable to select tubes 51 and 52 and the turns ratio of the transformer so that the plate conductance range corresponds to the control voltage range, and the secondary resistance when reflected to the winding 47 gives sufficient voltage control range to the motor 10 to keep its terminal voltage constant through the entire 0 to 180 degree phase difference of the phase difference sources.

As indicated above, where the apparatus is used for synchronizing a facsimile recorder or the like, an incoming signal may be substituted for the locally produced wave from the source 33. This incoming signal may be a tone which is generated at a distant transmitter, the speed of which may be varying slightly and when the arrangement disclosed is employed at the receiver, the transmitter and receiver will be maintained in synchronism. That is to say, the recorder will vary in speed in exactly the same manner as the transmitter varies in speed. However, the preferred system is, as suggested above, an arrangement in which the apparatus disclosed by Fig. 1 of the drawings is employed at both the transmitter and receiver, this apparatus at both stations to include a standard frequency source 33 of high precision.

It will be noted that the apparatus of Figs. 1 and 2 may be operated by alternating current. No high-power direct current supply is required. The tubes 51 and 52 may be used singly or in combination as may be required to produce the equivalent resistance range to control the motor voltage. Since low resistance and low leakage power transformers are utilized, the time constant of the combination is extremely low, and substantially instantaneous control is effected.

The stability of synchronism obtained by the voltage control method described is high and is readily controlled over a wide range of line voltage limits.

Fig. 9 represents a modification of the motor voltage control circuit of Fig. 1 in which two transformers are used. Transformer 78 is a standard power transformer, and transformer 79 is another power transformer having a high voltage winding consisting of two sections 81 and 82. The terminals of the input circuit of a pair of tubes 83 and 84 are indicated by reference character 86. This input circuit is connected across the condenser 62, for example, of Fig. 1, the preferred polarity of this connection being indicated on the drawings.

The primary of the transformer 78 is connected to a suitable source 88 of alternating current power which corresponds to the source 48 of Fig. 1. The secondary 91 of the transformer 78 is connected at its midpoint to the electrically joined cathodes of the tubes 83 and 84 and to their plates 93 and 94 through the high voltage windings 81 and 82 of the transformer 79. A winding 96 of the transformer 79 serves as a secondary and supplies driving power to a motor 98 which may drive a facsimile scanner similar to the scanner 11 on Fig. 1 of the drawings.

As each plate 93 or 94 goes alternately positive, current will flow through the corresponding high tension winding 81 or 82 of the transformer 79, the value of this current being controlled by the resistance of the tube that is conducting. The value of the tube resistance is proportioned to the instantaneous phase difference between the standard frequency and the motor tone frequency. The motor tone frequency is generated in a tone wheel generator 101 which corresponds in function to the tone wheel generator 26 of Fig. 1 of the drawings. The control of current in the high tension windings 81 and 82 controls the motor voltage. The motor 98 is of a type in which the speed is proportional to the applied voltage such as an inductor motor.

Fig. 10 of the drawings represents a further modification of the motor control circuit shown in Fig. 1 of the drawings. In this arrangement the input circuit of a pair of tubes 103 and 104, the terminals of which are indicated at 106, is connected, for example, across the condenser 62 of Fig. 1 of the drawings. The plates 108 and 109 of these tubes are connected across the two series connected high tension windings 111 and 112 of transformers 114 and 116. The primary 118 of the transformer 114 is connected to a suitable alternating current power source 119. The low tension winding 121 of the transformer 116 is connected to supply driving power to a motor 122 which may be similar to motors 10 and 98 of Figs. 1 and 9 respectively. The shaft of the motor or a mechanically moving part of the apparatus driven by the motor, drives a tone wheel generator 123 which corresponds in function to the tone wheel generator 26 of Fig. 1. Rectifier tubes 126 and 127 are connected in parallel with the tubes 103 and 104 respectively for the purpose of completing the circuit as each plate alternately becomes positive. The resistance introduced in series with the transformer secondaries of the transformers 114 and 116 is proportional to the instantaneous phase difference of the control source as explained in connection with Fig. 9 of the drawings. The voltage of the motor 122, and consequently its speed, is thereby maintained in synchronism with the control source, which, in the arrangement being discussed by way of example, is the control source 33 of Fig. 1 of the drawings.

Having now described the invention, what is claimed and desired to be secured by Letters Patent is the following:

1. In an apparatus for synchronizing the movement of a prime mover with that of another prime mover, and wherein a signal is provided indicative of the phase and speed of one of said prime movers, means for generating an electrical signal representative of the phase of the prime mover to be synchronized, means for combining the locally generated signal and the provided signal, a filter, means for impressing onto said filter energy proportional to the instantaneous combined values of the provided wave and the locally generated wave, and means responsive to at least a portion of the output of said filter to provide a resistance effect to affect the speed of the prime mover to be synchronized.

2. In an apparatus for synchronizing the movement of a prime mover with that of another prime mover, and wherein a signal is provided indicative of the phase and speed of one of said prime movers, means for locally generating a signal representative of the speed and phase of the prime mover to be synchronized, means for combining the provided signal with the locally generated signal, rectifying means, means for impressing said combined signals onto said rectifying means, energy storage means electrically associated with said rectifying means whereby energy of a value proportional to the value of the combined provided signal and locally generated signal is stored, a power supply circuit for one of said prime movers, and means to produce an ohmic resistance in said circuit which is proportional to the value of the stored energy.

3. In an apparatus for synchronizing the movement of a variable speed motor with that of a prime mover, and wherein a signal is provided indicative of the phase and speed of said prime mover, means for locally generating a signal representative of the speed and phase of said motor, means for combining the provided signal with the locally generated signal, rectifying means, means for impressing said combined signals onto said rectifying means, energy storage means electrically associated with said rectifying means whereby energy of a value proportional to the value of the combined provided signal and locally generated signal is stored, and means for varying the terminal voltage of said motor in accordance with the value of the stored energy.

4. In an apparatus for synchronizing the movement of a prime mover with that of another prime mover, and wherein a signal is provided indicative of the phase and speed of one of said prime movers, a tone wheel for generating an electrical signal representative of the phase of the prime mover to be synchronized, means for combining the locally generated signal and the provided signal, a filter, means for impressing onto said filter energy proportional to the instantaneous combined values of the provided wave and the locally generated wave, and means for utilizing at least a portion of the output of said filter to provide a resistance effect to affect the speed of the prime mover to be synchronized.

5. In an apparatus for synchronizing the movement of an induction motor with that of a prime mover, and wherein a signal is provided indicative of the phase and speed of one of said prime movers, a tone wheel for locally generating a signal representative of the speed and phase of the prime mover to be synchronized, means for combining the provided signal with the locally generated signal, rectifying means, means for impressing said combined signals onto said rectifying means, energy storage means electrically associated with said rectifying means whereby energy of a value proportional to the value of the combined provided signal and locally generated signal is stored, and means for varying the terminal voltage of said motor in accordance with the value of the stored energy.

6. A system for controlling the speed of a motor comprising means for developing a control voltage related to the speed and phase of a motor, a combined control and power supply circuit for said motor, comprising a transformer having a winding connected to a power supply source, a second transformer having a winding connected to said motor, a series circuit comprising additional windings of said transformers and a pair of discharge tubes, each tube having a control electrode, and means for connecting said control electrodes to said control voltage developing means.

7. The system in accordance with claim 6 wherein said discharge tubes are connected in opposition, and are each shunted by a diode.

8. A motor speed control system for synchronizing a motor by comparing the relative phase relationship of two alternating current waves of substantially identical frequency and of substantially constant amplitude comprising, means for producing an alternating current wave of a frequency related to the speed of the motor, means for producing a second alternating current wave of synchronizing frequency, the two waves being of substantially identical frequency and of substantially constant amplitude, means for comparing the two waves to produce a resultant alternating current wave having a variable amplitude determined by the phase displacement of the two waves, means for developing a unidirectional pulsating current of varying intensity from the resultant wave, means for developing an average voltage of varying intensity from the unidirectional pulsating current, and means for applying said voltage to produce a resistance effect in the supply circuit of the motor.

HENRY E. HALLBORG.
CHARLES N. GILLESPIE.
GILBERT R. CLARK.